May 17, 1966 M. L. MORGAN 3,252,091

FOUR-TERMINAL JUNCTION FOR ELECTRICAL MEASUREMENTS
AND METHOD OF MAKING THE SAME

Filed Dec. 8, 1961

Merle L. Morgan
INVENTOR.

BY Oliver D. Olson
Agent 3,252,091

FOUR-TERMINAL JUNCTION FOR ELECTRICAL MEASUREMENTS AND METHOD OF MAKING THE SAME

Merle L. Morgan, Portland, Oreg., assignor to Electro Scientific Industries, Inc., Portland, Oreg., a corporation of Oregon Filed Dec. 8, 1961, Ser. No. 157,897
6 Claims. (Cl. 324—126)

This invention relates to the precision measurement of electric potentials, and more particularly to the provision of a novel junction for use in instruments in which the precise measurement of electric potential is required at a junction of three branches of a circuit.

When joining three branches of a circuit, the metal junction has finite dimensions and resistance which will introduce errors in the measurement of potential at the junction unless the precise proper point on the junction is selected for the measurement. When current flows in one branch and out a second, the voltage at the branch not carrying current is defined as the potential of the junction. When current flows through all three branches, dividing at the junction, a fourth terminal attached to the junction is required for the measurement of junction potential. If this terminal is placed so that it has exactly the same potential as any one branch through which no current is flowing, its potential properly represents the junction potential when current flows in all three branches. Such considerations are important, for example, in the precise four-terminal measurement of low values of resistance joined together in a circuit.

Junctions having three planes of symmetry have been utilized heretofore to achieve this condition, but junctions of this type have imposed limitations on the positioning of the terminals and the efficient utilization of space in an instrument in which such junctions are incorporated.

Accordingly, it is the principal object of the present invention to provide a four-terminal junction, and a method for its manufacture, which junction overcomes the aforementioned limitations and affords the design of an instrument of minimum size and most efficient arrangement of terminals, by accommodating substantial variation in the shape of the junction and the relative positions of the terminals.

Another important object of this invention is the provision of a method of making a four-terminal junction which, by utilizing a junction base having a single plane of symmetry on which the terminals are located symmetrically with respect to the plane, adjustment to the required conditions is achieved by a single simple test.

A further important object of this invention is the provision of a four-terminal junction which is of simplified construction for economical manufacture.

The foregoing and other objects and advantages of this invention will appear from the following detailed description, taken in connection with the accompanying drawing in which.

Figures 4, 5, 6, 7, 8:
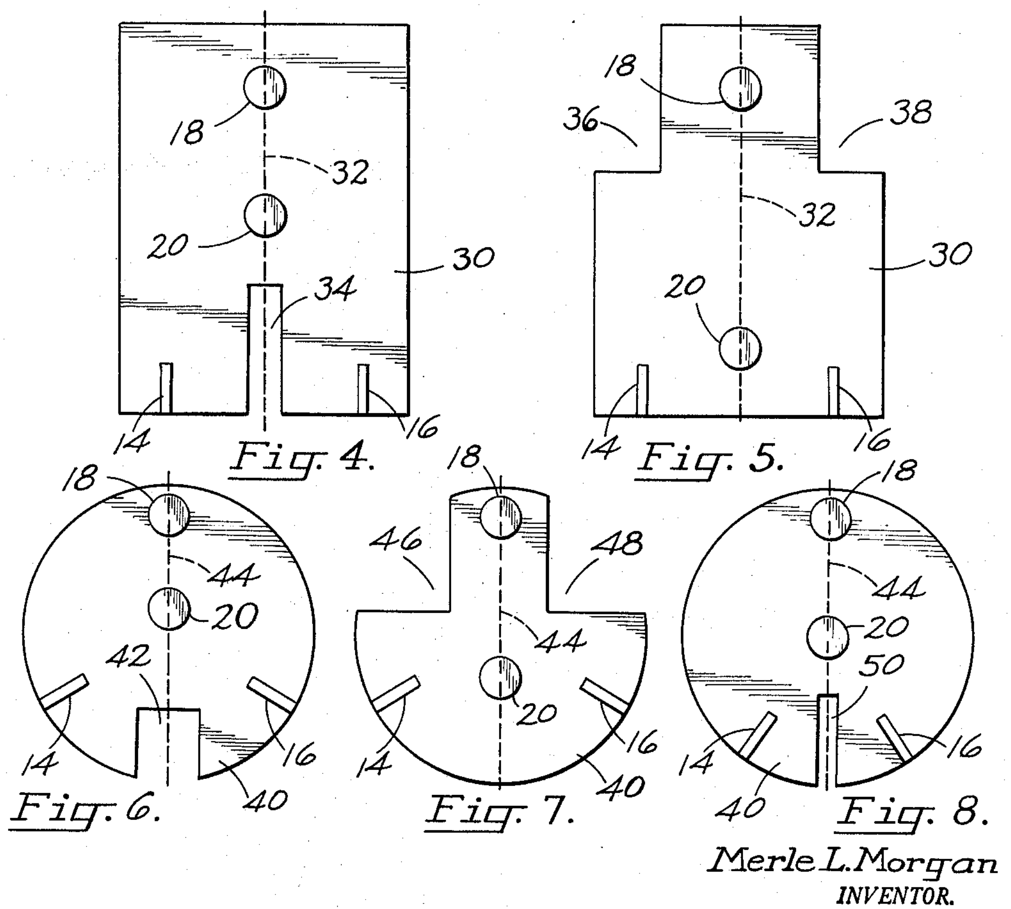
FIG. 4 is a plan view of a further modified form of four-terminal junction embodying features of the present invention.

FIG. 5 is a plan view of a further modified form of junction and illustrating the method of the present invention by which the junction of FIG. 4 may be modified to change the relative positions of terminals; and FIGS. 6, 7 and 8 are plan views of still further modified forms of four-terminal junctions embodying features of the present invention and illustrating the method of the present invention by which the relative positions of the terminals may be varied.

In its broad aspect, the present invention involves the provision of a four-terminal junction in which an electrically conductive base member has a single plane of symmetry and supports two pairs of terminals positioned in such manner that when an electric current is applied through any two of the four terminals there is substantially no voltage between the remaining two terminals.

Figure 1:
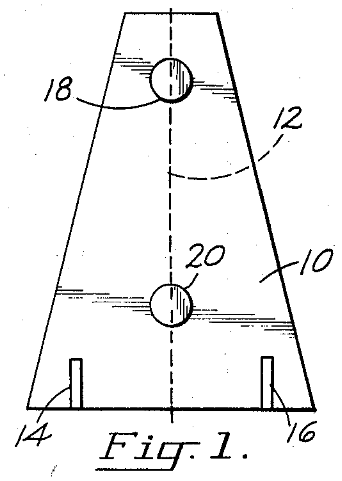
FIG. 1 is a plan view of a four-terminal junction embodying features of the present invention.

Referring first to FIG. 1, the junction illustrated therein includes a base member in the form of a plate 10, of electrically conductive material, such as copper. The plate is formed in the shape of a trapezoid having the single plane 12 of symmetry through its thickness. Although the plate preferably is of uniform thickness, the thickness may vary provided the variations are symmetrical with respect to the plane of symmetry. So, also, must the electrical characteristics of the plate be symmetrical with respect to the plane.

Mounted upon the plate are two pairs of terminals. The terminals 14, 16 of one pair are illustrated as upstanding flat straps received in slots formed in the plate and secured firmly therein as by soldering or other appropriate means. These terminals are positioned symmetrically on opposite sides of the plane 12 of symmetry.

Also secured to the plate is a second pair of terminals. The terminals 18, 20 of this pair are illustrated as upstanding circular posts secured in openings in the plate by means of soldering or other suitable means. The terminals of this second pair are positioned with their axes in the plane 12 of symmetry.

The relative positions of the terminals are determined as follows: Let it be assumed, for purposes of illustration, that it is desired that the terminals 14, 16 of the first pair be spaced apart the distance illustrated and that the distance between the terminals 18, 20 of the second pair may be variable. Accordingly, the terminals of the first pair and the upper terminal 18 of the second pair are secured in the positions illustrated by providing the appropriate openings and securing the terminals therein. The required position for the lower terminal 20 of the second pair then is established by the following procedure: A source of electric current is applied through terminal 18 and one of the terminals of the first pair, for example terminal 14. One terminal of a sensitive voltmeter is attached to the remaining terminal 16, and a probe connected to the other terminal of the voltmeter then is moved along the plane 12 of symmetry, in contact with the plate 10, until the voltmeter indicates substantially no voltage. This position of the probe identifies the point at which an equipotential line passing through terminal 16 intersects the plane 12, and represents the required position for the lower terminal 20 of the second pair. Accordingly, an opening is drilled in the plate at this point and the terminal secured therein.

Alternatively, the voltmeter may be attached to terminals 18 and 14 and the source of current applied through terminal 16 and the probe, and the latter moved along the plane 12 of symmetry to the position at which the voltmeter indicates substantially no voltage.

It will be understood that when the relative positions of the terminals have been established on the plate, any number of additional plates may be reproduced therefrom by conventional mass production techniques, for example by stamping, etc.

Figure 2:
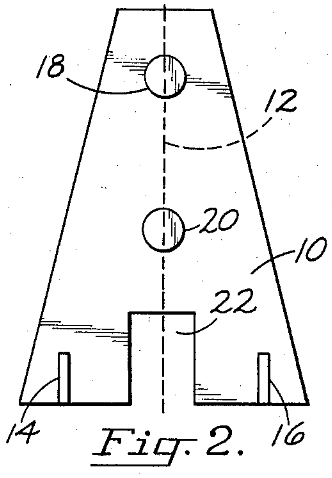
FIGS. 2 and 3 are plan views of modified forms of the junction shown in FIG. 1 and illustrating the method of this invention by which the relative positions of terminals may be varied.

Referring now to FIG. 2 of the drawing, let it be assumed that it is desired that not only shall the spacing between the terminals 14, 16 of the first pair be as illustrated, but also that the spacing between the terminals 18, 20 of the second pair shall be reduced from a distance illustrated in FIG. 1 to the distance illustrated in FIG. 2. Accordingly, the four terminals are secured to the plate in the positions illustrated. A source of current then is applied through one of the second pair of terminals 18, 20 and one of the first pair of terminals 14, 16 and a voltmeter is connected to the remaining terminals. A notch 22 then is cut into the plate 10, coaxial with the plane 12 of symmetry and upward from the wider parallel side of the plate toward the lower terminal 20 of the second pair, to a depth at which the voltmeter indicates substantially no voltage between the terminals connected thereto.

The shape of the notch 22 may be varied, as desired. For example, in place of the rectangular notch illustrated, a shallower notch of T-shaped configuration, or one of greater width, may be provided. Alternatively, a pair of notches may be provided, it being required that they be positioned symmetrically on opposite sides of the plane 12 of symmetry.

Figure 3:
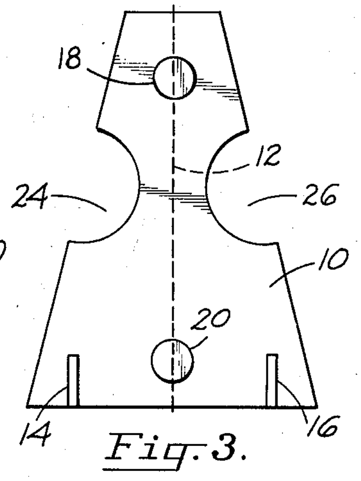

Referring now to FIG. 3, let it be assumed that it is desired that the terminals 14, 16 of the first pair be spaced apart as illustrated and that the terminals 18, 20 of the second pair also be spaced apart as indicated, a distance greater than the spacing in FIG. 1. Accordingly, the terminals are secured in the required positions, a source of electric current applied through one terminal of each pair and a voltmeter connected to the remaining terminals. Notches 24, 26 then are cut into the plate 10 from the lateral sides thereof between the spaced terminals 18, 20 of the second pair. Care must be taken that the notches be symmetrical with respect of the plane 12 of symmetry, and that the dimensions of the notches be enlarged only until the voltmeter indicates substantially no voltage between the terminals connected thereto.

Referring again to FIG. 1, it is possible that the location of terminal 20 might be slightly in error, because of the differences in size between the terminal post 20 and the probe employed in the test to locate the position. If such error is found to exist, upon testing with the fourth terminal 20 in place, correction of the error is effected by notching the plate to the required degree, in the manner of FIGS. 2 or 3. If the test equipment is not capable of indicating the polarity of the error, a test notch may be cut in the manner of notch 22 in FIG. 2 to establish the polarity of error. If the test notch increases the error, corrective notches are made in the manner of FIG. 3.

Since the test for error is very simple and fast, it may also be employed to check and correct all production units, thus affording a choice between the higher cost of tooling for precision reproduction and the lower cost of tooling for reproduction with a greater degree of tolerance for error. In the latter case, correction of error generally is achieved simply by slight hand filing of the notched area.

FIG. 4 illustrates a junction in which the base member is provided in the form of a rectangular plate 30 having the plane 32 of symmetry. The notch 34 is provided for reducing the spacing between the terminals 18, 20 of the second pair, from the spacing required when no notch is provided, in manner similar to FIG. 2. In FIG. 5 the rectangular plate 30 of FIG. 4 is cut away in its upper lateral areas to provide the symmetrical notches 36, 38 necessary to accommodate the greater spacing between the terminals 18, 20 of the second pair, in manner similar to FIG. 3.

In FIG. 6 of the drawing the base member is provided in the form of a circular disc 40. The terminals 14, 16 of the first pair and the outer terminal 18 of the second pair are positioned 120° apart, symmetrically about the axial center of the disc. It is known that if the inner terminal 20 of the second pair is positioned at the axial center of the disc, the disc and the assembly of four terminals are symmetrical about three planes of symmetry. Accordingly, there is obtained automatically the required condition of no voltage between any two of the terminals with current applied through the remaining two terminals. However, this arrangement permits no deviation from the requirement of three planes of symmetry as regards both the shape of the base plates and the relative positions of the terminals.

In accordance with the present invention, on the other hand, decreasing the spacing between the terminals 18, 20 of the second pair from the symmetrical arrangement just described to the spacing illustrated in FIG. 6, is achieved by cutting a notch 42 into the disc. This notch is formed symmetrical with respect to the plane 44 of symmetry, and extends toward the inner terminal 20 of the second pair to the depth determined by the test of no voltage described hereinbefore.

To increase the spacing between the terminals 18, 20 of the second pair, from the symmetrical arrangement discussed in connection with FIG. 6 to the spacing illustrated in FIG. 7, spaced notches 46, 48 are formed in the disc 40 between the spaced terminals 18, 20 of the second pair symmetrical with respect to the plane 44 of symmetry, in manner similar to FIGS. 3 and 5.

FIG. 8 illustrates an arrangement in which the spacing between the terminals 14, 16 of the first pair is reduced from the spacing illustrated in FIGS. 6 and 7, and the inner terminal 20 of the second pair is positioned on the axial center of the disc. This arrangement is afforded by the notch 50 cut into the disc symmetrical with the plane 44 of symmetry and toward the inner terminal 20 of the second pair to the depth dictated by the test of no voltage previously described.

It will be apparent from the foregoing that four-terminal junctions may be provided, in accordance with the present invention, in a wide variety of shapes and terminal spacings. The only essential requirements are that the junction base member be in a shape which provides a single plane of symmetry, that the terminals of one pair be positioned on this plane of symmetry, and that the terminals of the other pair be spaced apart symmetrically on opposite sides of the plane of symmetry.

Thus, the base member may take the shape of a triangle, a pyramid, a cone, or any other of many shapes having a single plane of symmetry. The dimensions of the base member and the dimensions and positions of the notches are determined in part by the requirements of relative spacings between the terminals.

The outer terminals 14, 16, 18 may project from either face of the base member, or from the side edges thereof, and the terminals and notches may be of any desired shape, provided, however, that in any event the halves of the completed junction relative to the plane of symmetry must be mirror images of each other.

The foregoing and other modifications, variations and changes in shape, size and relative positions of elements, may be made without departing from the spirit of this invention and the scope of the appended claims.

Having now described my invention and the manner in which it may be used, what I claim as new and desire to secure by Letters Patent is:

1. A four-terminal junction for electrical measurements, comprising an electrically conductive base member having a single plane of symmetry, a first pair of spaced terminals engaging the base member on said plane, and a second pair of spaced terminals engaging the base member symmetrically on opposite sides of said plane, the assembly of base and terminals having mirror symmetry with respect to said single plane, the terminals of the first and second pair being positioned relative to each other in such manner that an electric current applied through one terminal of each pair produces substantially no voltage between the remaining two terminals.

2. A four-terminal junction for electrical measurements, comprising an electrically conductive base member having a single plane of symmetry, a first pair of terminals engaging the base member on said plane in predetermined spaced relation, and a second pair of spaced terminals engaging te base member symmetrically on the opposite sides of said plane in predetermined spaced relation, the base member being cut away in minor symmetry with respect to said plane in such manner that an electric current applied through one terminal of each pair produces substantially no voltage between the remaining two terminals.

3. The method of making a four-terminal junction for electrical measurements, comprising forming an electrically conductive base member with a single plane of mirror symmetry, mounting on the base member a first pair of terminals spaced apart on said plane in mirror symmetry with respect to said plane and a second pair of terminals spaced apart on opposite sides of said plane in mirror symmetry with respect to said plane with the terminals positioned relative to each other in such manner that an electric current applied through one terminal of each pair produces substantially no voltage between the remaining two terminals.

4. The method of making a four-terminal junction for electrical measurements, comprising forming an electrical conductive base member with a single plane of mirror symmetry, mounting a first pair of terminals at predetermined spaced positions on said plane of the base member in mirror symmetry with respect to said plane mounting a second pair of terminals at predetermined spaced positions on the base member on opposite sides of said plane in mirror symmetry with respect to said plane, applying an electric current through one terminal of each pair, connecting a voltage indicator to the remaining two terminals, and cutting away portions of the base member in mirror symmetry with respect to said plane of symmetry until substantially no voltage is indicated between the terminals connected to the voltage indicator.

5. The method of making a four-terminal junction for electrical measurements, comprising forming an electrically conductive base member with a single plane of mirror symmetry, mounting a first pair of terminals at predetermined spaced position on the base member on opposite sides of said plane in mirror symmetry with respect to said plane mounting one of a second pair of terminals on said plane of the base member in mirror symmetry with respect to said plane, applying an electric current through the mounted terminal of the second pair and one of the terminals of the first pair, connecting one terminal of a voltage indicator to the remaining mounted terminal of the first pair, moving a probe connected to the other terminad of the voltage indicator along said plane of symmetry to establish the position for the other terminal of the second pair at which substantially no voltage is indicated on the voltage indicator, and mounting said other terminal of the second pair of said established position in mirror symmetry with respect to said plane.

6. The method of making a four-terminal junction for electrical measurements, comprising forming an electrically conductive base member with a single plane of mirror symmetry, mounting a first pair of terminals at predetermined spaced positions on the base member on opposite sides of said plane in mirror symmetry with respect to said plane, mounting one of a second pair of terminals on said plane of the base member in mirror symmetry with respect to said plane, connecting a voltage indicator between the mounted terminal of the second pair and one of the terminals of the first pair, connecting one terminal of a source of electric current to the remaining mounted terminal of the first pair, moving a probe connected to the other terminal of the current source along said plane of symmetry to establish the position for the other terminal of the second pair at which substantially no voltage is indicated on the voltage indicator, and mounting said other terminal of the second pair at said established position in mirror symmetry with respect to said plane.

References Cited by the Examiner

UNITED STATES PATENTS 1,895,643 1/1933 Putnam ____________ 324—62
1,951,799 3/1934 Lederer ____________ 324—126
3,068,438 12/1962 Rollins ___________ 338—28 X WALTER L. CARLSON, *Primary Examiner.*